US010212599B1

(12) United States Patent
Sarthi

(10) Patent No.: US 10,212,599 B1
(45) Date of Patent: Feb. 19, 2019

(54) METHOD FOR PREVENTING UNAUTHORIZED USE OF ELECTRONIC ACCESSORIES

(71) Applicant: NXP B.V., Eindhoven (NL)

(72) Inventor: Sonal Rattnam Sarthi, Bangalore (IN)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 15/899,358

(22) Filed: Feb. 19, 2018

(51) Int. Cl.
*H04W 12/08* (2009.01)
*H04W 12/04* (2009.01)
*H04W 12/06* (2009.01)
*H04W 4/80* (2018.01)
*H04L 29/06* (2006.01)
*H04W 88/02* (2009.01)

(52) U.S. Cl.
CPC ........... *H04W 12/08* (2013.01); *H04W 12/04* (2013.01); *H04W 12/06* (2013.01); *H04L 63/0492* (2013.01); *H04W 4/80* (2018.02); *H04W 88/02* (2013.01)

(58) Field of Classification Search
CPC ..... H04W 12/08; H04W 12/04; H04W 12/06; H04W 4/80; H04W 88/02; H04W 4/00; H04W 24/08; H04W 48/16; H04W 60/04; H04W 64/00; H04W 76/02; H04W 8/00; H04W 8/18; H04L 63/0492; H04L 12/28; H04L 29/06; H04L 29/08; H04L 9/00
USPC ................... 370/328; 455/41.1, 50
See application file for complete search history.

(56) References Cited

U.S. PATENT DOCUMENTS

| | | | |
|---|---|---|---|
| 6,504,480 B1* | 1/2003 | Magnuson | G07C 9/00142 340/5.1 |
| 9,197,414 B1* | 11/2015 | Martin | H04L 9/14 |
| 2008/0263363 A1* | 10/2008 | Jueneman | G06F 21/32 713/184 |
| 2011/0055546 A1* | 3/2011 | Klassen | G06F 21/305 713/150 |
| 2011/0096726 A1* | 4/2011 | Schlack | H04W 72/0453 370/328 |
| 2011/0210831 A1 | 9/2011 | Talty et al. | |
| 2013/0091540 A1* | 4/2013 | Chen | H04W 4/21 726/1 |
| 2013/0132854 A1* | 5/2013 | Raleigh | G06F 3/0482 715/738 |
| 2015/0111607 A1* | 4/2015 | Baldwin | H04W 4/02 455/500 |
| 2016/0021489 A1* | 1/2016 | Yim | H04W 4/008 455/41.1 |
| 2016/0057695 A1* | 2/2016 | Tomida | H04W 48/16 370/328 |
| 2016/0134831 A1 | 5/2016 | Dixit | |
| 2016/0358396 A1 | 12/2016 | Spiess et al. | |
| 2017/0048373 A1* | 2/2017 | Dees | H04L 12/2809 |

(Continued)

*Primary Examiner* — Nathan S Taylor
(74) *Attorney, Agent, or Firm* — Charles E. Bergere

(57) ABSTRACT

An electronic slave device that provides one or more services to master devices, can be registered with a single true-owner device and one or more co-owner devices. The true-owner device can set independent permissions for the slave device's services as being free (all can use), restricted (only true-owner and co-owners can use), or locked (only true-owner can use), and hide locked services from non-owner devices. In one commerce mode, the slave device is sold with the true-owner device. In another commerce mode, the slave device is sold separately and the initially requesting master device can be the true-owner device.

15 Claims, 4 Drawing Sheets

(56) References Cited

U.S. PATENT DOCUMENTS

2017/0201850 A1* 7/2017 Raleigh .................. H04W 4/50
2017/0359717 A1* 12/2017 Adler .................... H04W 12/04

* cited by examiner

METHOD FOR PREVENTING UNAUTHORIZED USE OF ELECTRONIC ACCESSORIES

BACKGROUND

The present invention relates generally to consumer electronics devices and, more particularly, to a method for preventing unauthorized use of electronic accessories by other electronic devices.

Theft of consumer electronics is a significant problem. Technology that inhibits theft is advantageous in the associated marketplace. Also, consumer electronics may carry sensitive data that can be a potential threat in the wrong hands. Technology that helps secure consumer electronics against unauthorized access and usage is helpful and important.

As used herein, the terms "slave device" and "slave" refer to an electronic device whose use is designed to be controlled by another electronic device referred to using the terms "master device" or "master." An electronic accessory that is usable with a master device is a slave device. For example, a Bluetooth headphone is a slave device designed to be controlled by a master device such as a smartphone or a tablet. Hearables, wearables, smart jewelry, fitness trackers, health monitors, and IoT (Internet of Things) devices are all examples of slave devices.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
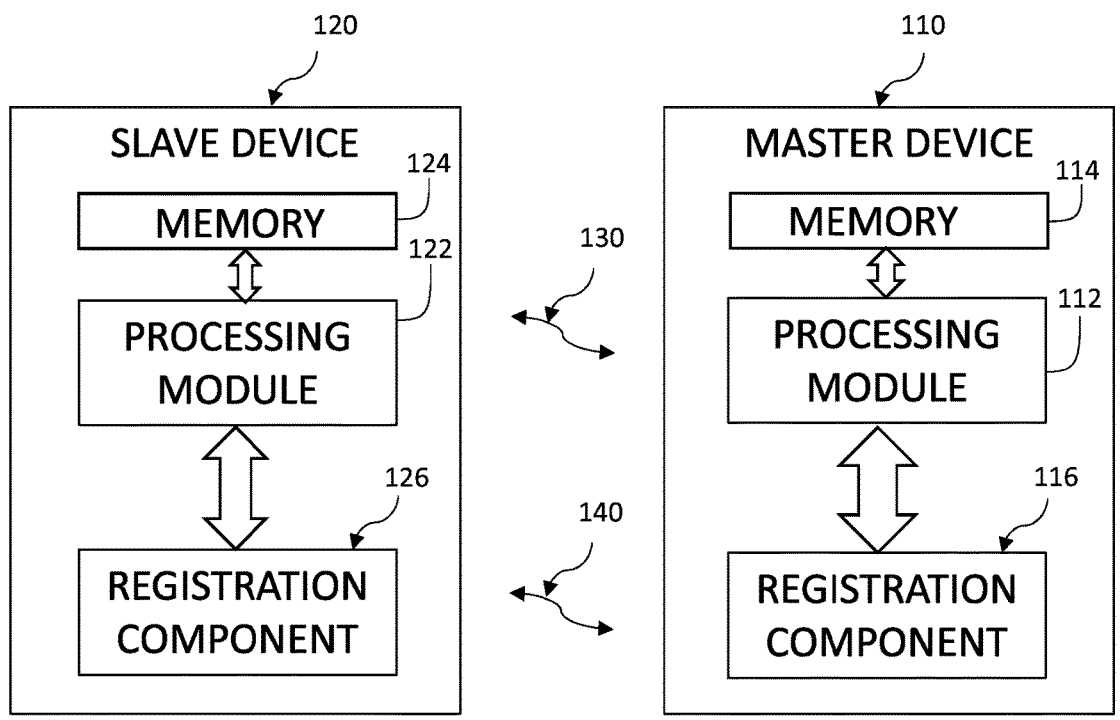
FIG. 1 is a simplified block diagram of an electronics system comprising a master device designed to operate using a slave device.

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

One way to inhibit the theft of consumer electronics is to limit the use of a slave device to one or more specific master devices. For example, if a Bluetooth headset is limited to being used with a set of one or more smartphones or tablets, then there will be little incentive for someone to steal that headset because it will not be able to be used with any other smartphones or tablets. In one embodiment, the present invention uses NFC (Near Field Communications) technology to secure an electronic accessory (i.e., a slave device) to its host (e.g., a smartphone) by using a NFC tag in the accessory device.

As used herein, reference to "a slave device" should be understood to correspond to a specific unit or instance of the slave device, as opposed to a generic reference to a brand or model of identical slave devices. Similarly, reference to "one or more master devices" should be understood to correspond to one or more specific units or instances of the master devices, as opposed to a generic reference to one or more brands or models of identical master devices. Thus, when a slave device is said to be limited to being used with three master devices, that means that a specific instance of the slave device (e.g., a specific Bluetooth headset) is limited to being used with three specific instances of master devices (e.g., a specific smartphone and two specific tablets), as opposed to meaning that Brand Q of slave devices is limited to being used with Brands X, Y, and Z of master devices.

In one embodiment, the present invention is a slave device for use with one or more master devices. The slave device includes a registration component and a processing module, and supports one or more services. The registration component is configured to enable a master device to register as a true-owner device of the slave device. The processing module is configured to enable the true-owner device to use the slave device. The slave device allows the true-owner device to selectively limit access to the one or more services by other master devices. The registration component supports communication with the true-owner device via a wireless registration link. The processing module supports communication with the one or more master devices via an operations link having a longer range than the wireless registration link.

In another embodiment, the present invention is a master device for use with a slave device that supports one or more services. The master device includes a registration component that enables the master device to register as a co-owner device of the slave device, and a processing module that enables a true-owner device and the co-owner device to use the slave device. The true-owner device is configured to selectively limit access to the one or more services by other master devices. For each of the services, the slave device is configured to allow the true-owner device to set permission for the service as one of (i) a free service that can be used by any master device; (ii) a restricted service that can be used only by the true-owner device and any co-owner devices; and (iii) a locked service that can be used only by the true-owner device.

There are two basic modes for selling slave devices for master devices. In the first mode, a slave device is sold with a master device with which the slave device is to be used. In the second mode, a slave device is sold separately from any master device with which the slave device may be used. This disclosure describes techniques for controlling the use of slave devices for both of these modes of commerce. In particular, these techniques enable master and slave devices to be configured such that a slave device can be used only with one or more specified master devices.

In general, according to these techniques, a single master device can be configured to be the "true owner" of a slave device. When the slave device is sold with a master device, that master device will be the true-owner device for that slave device. When the slave device is sold separately, the first master device that registers as the true owner will become the true-owner device for that slave device. This master device is referred to herein as the initially requesting master device.

In general, a slave device is able to provide one or more different services to a master device. An example of a slave device is a home automation device that can perform a variety of different services such as playing music, surfing the Internet, and controlling IoT home appliances. Another example of a slave device is a headset that can perform a variety of different services such as streaming music and answering phone calls. For each service, the true-owner device is able to control whether or not other master devices can access that service from the slave device. In certain embodiments, for each slave device service independently, the true-owner device can make that service (i) available to all other master devices (referred to as a "free service"), (ii) available to only specific, so-called "co-owner" master devices (referred to as a "restricted service"), or (iii) available to only the true-owner device (referred to as a "locked service").

As indicated above, there are potentially three different types of master devices for a slave device: a single true-owner device, one or more co-owner devices, and all other, so-called "non-owner" devices. The latter two types of master devices may also be referred to collectively as "non-true-owner" devices. The true-owner device is always able to use all of the slave device's services. A co-owner device is able to use only those services that are either free or restricted. A non-owner device is able to use only those services that are free.

In addition, in certain embodiments, the true-owner device can control whether or not other master devices are aware of services that are restricted or locked. In one embodiment, the true owner device can set a "Hide Locked Services" bit that will prevent all non-owner devices from seeing a service that is locked. If the Hide Locked Services bit is set, all non-owner devices will be able to see services that are either free or restricted, and all co-owner devices will be able to see all of the slave device's services. Locked services can be used only by the true-owner device. Hiding the locked services would essentially mean hiding the potential capabilities of the slave device. When the Hide Locked Services bit is set, the non-owner devices will not be aware that the slave device can provide services that the true-owner device has marked as being locked. The user of the true-owner device may choose to mark some extremely critical and important services as locked and hide them as well. An example of such a service may be the control of door locks in a home automation slave. Another example service may be "personal data" sharing. The default value for the "Hide Locked Services" bit is '0', which indicates that any master device will be able to see all of the slave device's services. In another implementation, setting the "Hide Locked Services" bit hides locked services from co-owner devices as well and not just from non-owner devices.

In certain embodiments, the default for service permissions is that all services of a slave device can be used by any master device. After a master device has been registered as the true owner of the slave device, that true-owner device can, but does not have to, restrict or lock individual services.

In certain embodiments, the true-owner device can selectively unregister individual, previously registered co-owner devices by accessing and removing the co-owner devices from a slave device's list of registered co-owner devices.

Referring now to FIG. 1, a simplified block diagram of an electronics system 100 comprising a master device 110 designed to operate using a slave device 120, according to certain embodiments. The master device 110 can communicate with the slave device 120 via two different wireless links: an operations link 130 used for normal operations of the slave device 120 by a master device 110, and a registration link 140 used one time to register a master device 110 as the true owner of the slave device 120.

In the presently preferred embodiment, the operations link 130 is a relatively long-range, wireless link such as a Bluetooth link that conforms to the Bluetooth protocol, while the registration link 140 is a relatively short-range, wireless link such as an NFC link that conforms to the Near-Field Communication (NFC) protocol. In other embodiments, one or both of the links may conform to other wireless protocols, such as wifi, or be wired instead of wireless. Unless specified otherwise, the following descriptions assume that the operations link 130 is a Bluetooth link, and the registration link 140 is an NFC link.

The slave device 120 has a processing module 122, a memory 124, and a registration component 126. The memory 124 may be either separate or integral with the processing module 122, and is accessed by the processing module 122 for storing data, as described in detail below. The registration component 126 is designed to handle the slave device's true-owner registration processing including the associated communications with the master device 110 via the NFC registration link 140, while the processing module 122 is designed to handle the rest of the slave device's operations including the communications with the master device 110 via the Bluetooth operations link 130 that are associated with the normal operations of the slave device 120 by the master device 110. For the NFC link 140, the registration component 126 may be an NFC tag, an NFC-emulated card, an NFC read/write component, or other suitable electronic component that supports NFC communications.

The master device 110 also has a processing module 112, a memory 114, and registration component 116 that are respectively analogous to the corresponding elements in the slave device 120.

The master device 110 and the slave device 120 are assumed to have their own power sources, such as batteries (not shown in FIG. 1).

First Commerce Mode: Slave Device Sold with True-Owner Device

As described previously, in this first mode of commerce, a slave device is sold with its true-owner master device. In that case, the slave device is pre-configured (e.g., during product manufacturing) with the following stored values, which are stored in the memory 124:

A unique identification (ID) number for the true-owner device;
An encrypted key; and
A decrypted key corresponding to the encrypted key.

The true-owner ID number and the decrypted key preferably are stored in the memory 124 of the slave device 120 as part of a digital signature for the true-owner device. The master device 110 is pre-configured with a decrypting key that the master device 110 can use to generate the decrypted key from the encrypted key. Note that the encrypted key can be successfully decrypted only with that particular decrypting key.

The slave device 120 is designed to maintain the following information in the memory 124:

A True-Owner Registration bit indicating whether or not the true-owner device has been registered with the slave device. The default value is '0' indicating that the true-owner device has not been registered;
The ID number of each registered co-owner device;
A permissions table that keeps track of whether each of the slave device's services is free, restricted, or locked. The default is that all services are free;
A Hide Locked Services bit indicating whether or not locked services are hidden from non-owner devices. The default value is '0' indicating that locked services are not hidden; and
A Global Lock bit indicating whether or not any of the slave device's services are restricted or locked. The default value is '0' indicating that no services are restricted or locked, i.e., all services are free.

Before a master device 110 registers with the slave device 120 as the true owner, all services are available for all master devices. When the true-owner device registers as the true owner, the true-owner device can determine whether or not to restrict or lock any of the slave device's services.

Furthermore, the true-owner device can subsequently change the permissions for the slave device's services.

Registration for the True-Owner Device

Figure 2:
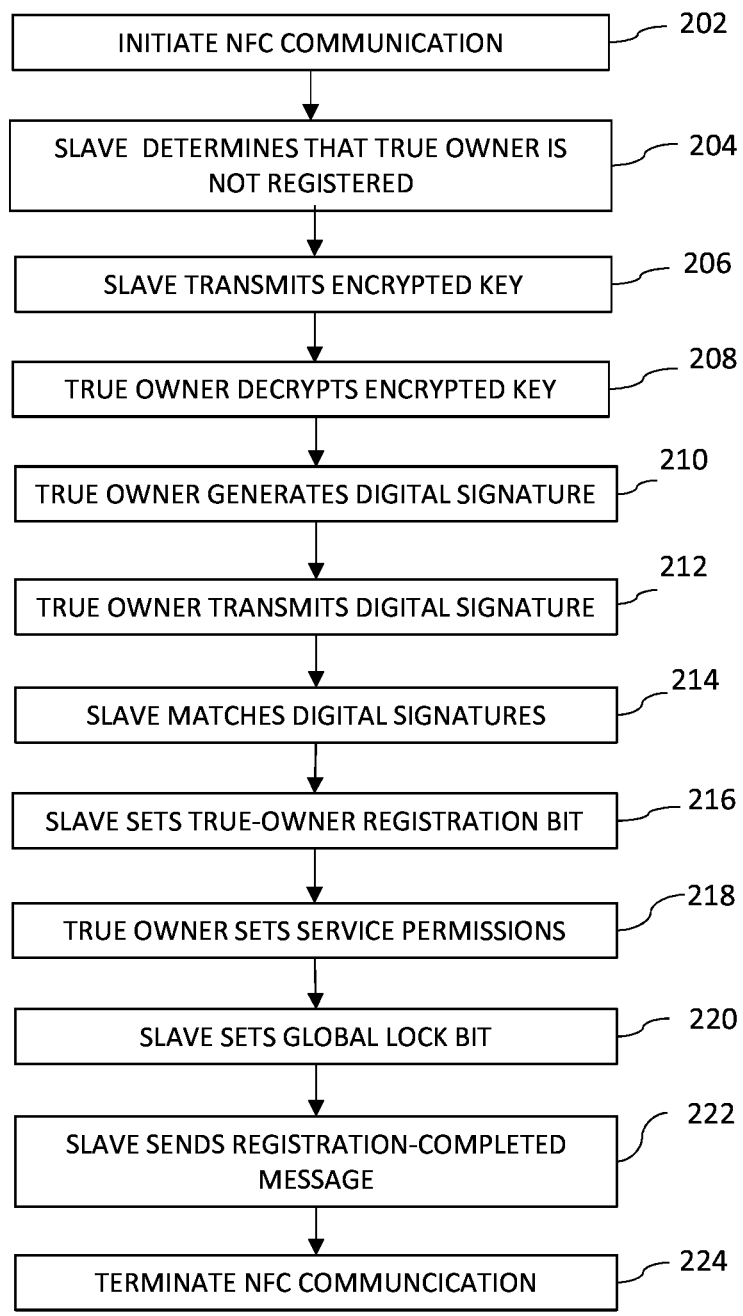
FIG. 2 is a flow chart illustrating processing in the system of FIG. 1 if (i) the master device is the true-owner of the slave device and when (ii) the true-owner registers with the slave device as the true owner.

FIG. 2 is a flow chart illustrating processing in the system 100 of FIG. 1 if (i) the master device 110 is the true-owner device sold with the slave device 120 and when (ii) the true-owner device 110 registers with the slave device 120 as the true owner. All of the communications in FIG. 2 are implemented using the NFC link 140.

In step 202, the powered-on master device 110 and slave device 120 are brought sufficiently close to each other (e.g., less than about 4 cm) to initiate short-range NFC communication between them. The steps involved in the initiation of the NFC communication are dictated by the NFC protocol and are not explicitly described here. Although not shown in FIG. 2, if the devices 110 and 120 are within Bluetooth range of each other, but not within NFC range, then normal operational processing is performed, as described later in reference to FIGS. 3 and 4.

In step 204, the slave device 120 checks the True-Owner Registration bit to determine that the master device 110 has not yet been registered. Although not shown in FIG. 2, if the master device 110 had previously registered with the slave device 120 during a previous implementation of the processing of FIG. 2, then the True-Owner Registration bit would have been set during that previous processing and, immediately after current step 204, the NFC communication would be terminated and the current processing of FIG. 2 would end. That would also be the case for any other master device that initiates NFC communications with the slave device 120 after the master device 110 has been registered.

In step 206, the slave device 120 transmits its stored encrypted key to the master device 110. In step 208, the master device 110 decrypts the encrypted key using its stored decrypting key to generate the decrypted key.

In step 210, the master device 110 generates the following digital signature:

[MASTER DEVICE ID][DECRYPTED KEY][TRUE-OWNER BIT]

where:
MASTER DEVICE ID is the ID number of the true-owner device 110;
DECRYPTED KEY is the value of the decrypted key; and
TRUE-OWNER BIT has a value of '1' to indicate that the master device 110 is the true owner of the slave device 120.

In step 212, the master device 110 transmits the digital signature to the slave device 120.

In step 214, the slave device 120 compares the master device ID number and the decrypted key in the digital signature received from the master device 110 with the true-owner ID number and the decrypted key stored in the slave device 120 and determines that they both match. Although not shown in FIG. 2, if one or both received values do not match the corresponding stored values, then the slave device 120 sends an NFC message to the master device 110 indicating that the attempt to register the master device 110 as the true owner has failed. The slave device 120 then closes its NFC connection to the master device 110. In some implementations, the slave device 120 keeps track of the number of failed attempts by a master device to register as the true owner. After reaching a specified maximum number of consecutive failed attempts, the slave device 120 will not allow that master device any further attempts at registration.

In step 216, the slave device 120 sets the True-Owner Registration bit to '1' to indicate that the true owner has been registered and transmits to the master device 110 (which now is registered as the true-owner device) an NFC message indicating that its true-owner registration attempt was successful.

In step 218, the slave device 120 allows the registered true-owner device 110 to set permissions for the services offered by the slave device 120. In one possible implementation, the slave device 120 communicates with the true-owner device 110 to complete a service-permission table according to the following Table I, including the Hide Locked Services bit. For each of N services supported by the slave device 120, Table I identifies whether the service is free, restricted, or locked, where N may be any positive integer, including '1' for a slave device 120 that provides only one service.

TABLE I

| Service Number | Service Name | Free All ☐ | Restrict All ☐ | Lock All ☐ |
|---|---|---|---|---|
| 1 | Service 1 | Free ☐ | Restricted ☐ | Lock ☐ |
| 2 | Service 2 | Free ☐ | Restricted ☐ | Lock ☐ |
| 3 | Service 3 | Free ☐ | Restricted ☐ | Lock ☐ |
| 4 | Service 4 | Free ☐ | Restricted ☐ | Lock ☐ |
| . . . | . . . | . . . | . . . | . . . |
| N | Service N | Free ☐ | Restricted ☐ | Lock ☐ |
|  | Hide Locked Services | Yes ☐ | No ☐ |  |

In step 220, if any of the services are restricted or locked, then the slave device 120 sets its Global Lock bit to '1'; otherwise, the slave device 120 maintains the Global Lock bit at its default value of '0'.

In step 222, the slave device 120 sends the true-owner device 110 an NFC message indicating that the true-owner registration process is complete.

In step 224, the slave device 120 and the true-owner device 110 terminate the NFC connection.

As indicated previously, after the true-owner device 110 is registered with the slave device 120, any subsequent attempt by any master device to register as the true owner with the slave device 120 will fail.

Although not represented in FIG. 2, in some implementations, the slave device 120 shares a master reset key with the true-owner device 110, which the user of the true-owner device 110 should safely store elsewhere. If the true-owner device 110 is lost or permanently damaged, then the true-owner device 110 would not be available to modify the permissions previously set in Table I. In that case, the user can configure another master device to provide the reset key to the slave device 120, for example, to reset all of the permissions to the default of having all of the slave device's services free.

Normal Operations for the True-Owner Device

Figure 3:
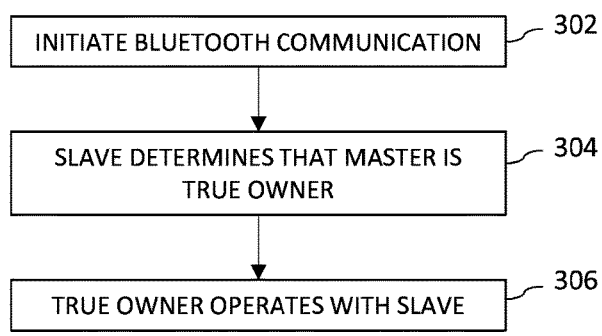
FIG. 3 is a flow chart illustrating processing in the system of FIG. 1 if (i) the master device is the true-owner of the slave device and after (ii) the true-owner has successfully registered as the true owner with the slave device.

FIG. 3 is a flow diagram of the processing in the system 100 of FIG. 1 if (i) the master device 110 is the true-owner device sold with the slave device 120 and after (ii) the true-owner device 110 has successfully registered as the true owner with the slave device 120. All of the communications in FIG. 3 are implemented using the Bluetooth link 130.

In step 302, the powered-on true-owner device 110 connects to the powered-on slave device 120 using the Bluetooth protocol. The steps involved in the initiation of the Bluetooth link 130 are dictated by the Bluetooth protocol and are not explicitly described here. As part of step 302, the true-owner device 110 transmits its ID number to the slave device 120.

In step 304, the slave device 120 determines that the true-owner device 110 is the true owner by comparing the received ID number with the previously stored ID number of the true-owner device 110. If the master device 110 were not the slave device's true owner, then the processing of FIG. 4 would apply.

In step 306, the slave device 120 enables the true-owner device 110 to update any of the permissions in Table I using Bluetooth communications. During step 306, the true-owner device 110 can make any changes to the permissions for any of the services as well as changing the value for the Hide Locked Services bit. The slave device 120 will update the value of the Final Lock bit as necessary.

In step 306, the true-owner device 110 can operate with the slave device 120 via the Bluetooth connection using any of the slave device's services.

Normal Operations for a Non-True-Owner Device

Figure 4:
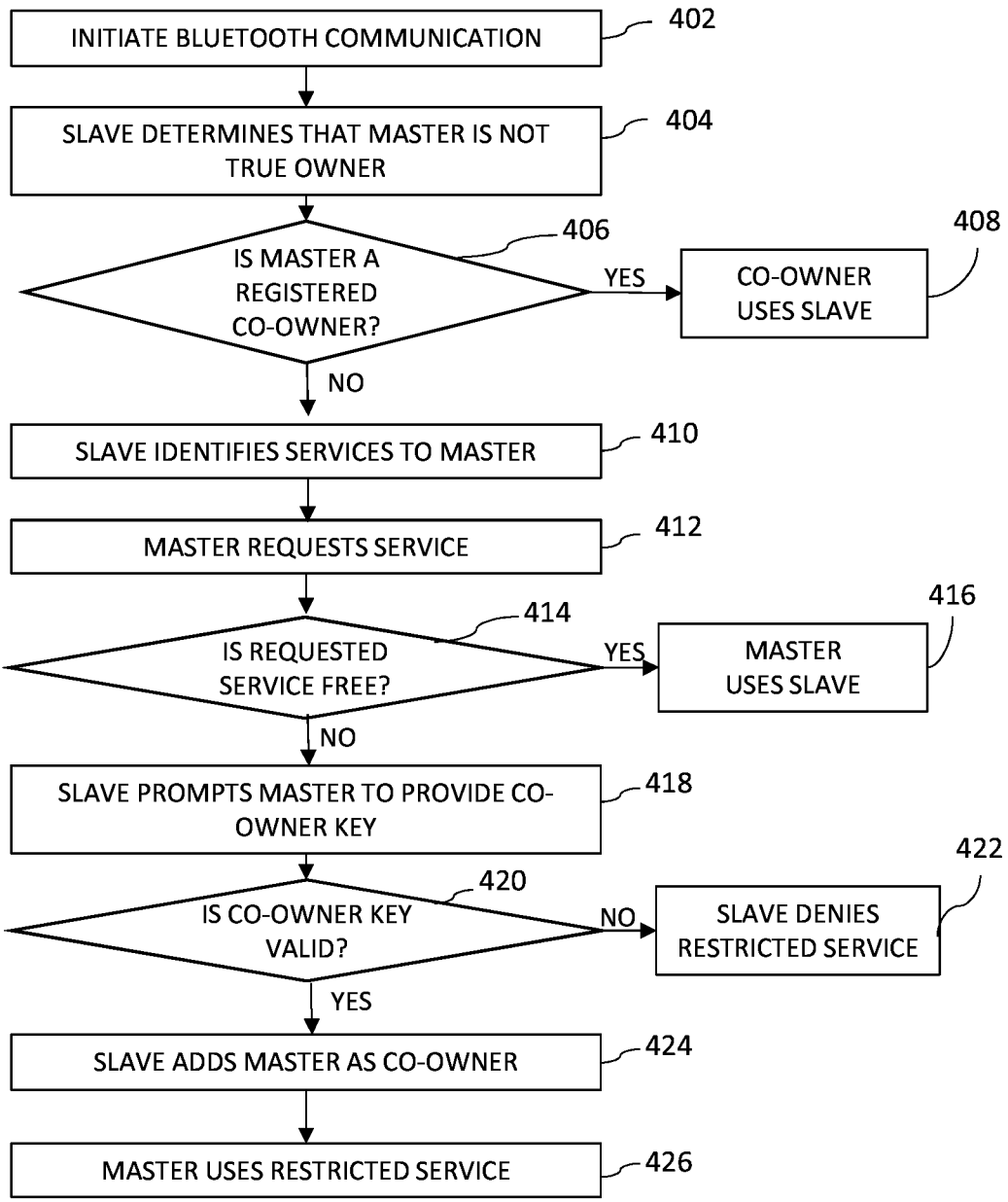
FIG. 4 is a flow chart illustrating processing in the system of FIG. 1 if (i) the master device is not the true owner for the slave device and after (ii) the true-owner has successfully registered with the slave device as the true owner.

FIG. 4 is a flow diagram of the processing in the system 100 of FIG. 1 if (i) the master device 110 is not the true owner for the slave device 120 and after (ii) the true-owner device has successfully registered with the slave device 120 as the true owner. The master device 110 may be a co-owner device or a non-owner device. All of the communications in FIG. 4 are implemented using the Bluetooth link 130.

In step 402, the powered-on master device 110 connects to the powered-on slave device 120 using the Bluetooth protocol. As part of step 402, the master device 110 transmits its ID number to the slave device 120.

In step 404, the slave device 120 determines that the master device 110 is not the true owner by comparing the received ID number with the previously stored ID number of the true-owner device. If the master device 110 were the slave device's true owner, then the processing of FIG. 3 would apply.

In step 406, the slave device 120 determines whether the master device 110 is a previously registered co-owner device by comparing the received ID number with the ID numbers of the slave device's previously registered co-owner devices. If the slave device 120 determines that the master device 110 is a registered co-owner, then processing continues to step 408, where the slave device 120 allows the co-owner device 110 to use any of its free or restricted services.

If, in step 406, the slave device 120 determines that the master device 110 is not a previously registered co-owner device, then processing continues to step 410, where the slave device 120 identifies its free and restricted services to the master device 110.

In step 412, the master device 110 transmits a requested service to the slave device 120.

If, in step 414, the slave device 120 determines that the requested service is a free service (by referring to Table I), then, in step 416, the slave device 120 allows the master device 110 to use the requested, free service. As described previously, any master device can use a free service, but only the true-owner device and any co-owner devices can use a restricted service.

If the slave device 120 determines in step 414 that the requested service is a restricted service, then, in step 418, the slave device 120 prompts the master device 110 to transmit its co-owner key to the slave device 120. In certain implementations, the co-owner key is the same as the digital signature of the true-owner device, but with the TRUE-OWNER BIT set to '0'. The master device 110 may be pre-configured with the co-owner key during manufacturing or the master device 110 may be configured with the co-owner key by communicating with the true-owner device or by being programmed directly by the user of the true-owner device. Other possibilities may also exist.

In step 420, the slave device 120 determines whether or not the received co-owner key is valid by comparing the first two fields of the co-owner key with the first two fields of the true-owner digital signature stored in the slave device. If both values match, then the co-owner key is valid and, in step 424, the slave device 120 adds the master device 110 to its list of registered co-owner devices. In step 426, the slave device 120 allows the registered co-owner device 110 to use the requested, restricted service.

If the master device 110 does not have a valid co-owner key, then the master device 110 may send an invalid co-owner key when prompted by the slave device 120 or the master device 110 might not send anything. If the master device 110 sends an invalid co-owner key, then the match of step 420 will fail. If the master device 110 does not send anything, then the slave device 120 would time out after a defined period of time in step 420. If, in step 420, the slave device 120 determines that the received co-owner key is invalid, then, in step 422, the slave device 120 updates a list of master devices that failed to register as a co-owner. In some implementations, the slave device 120 keeps track of the number of failed attempts by each master device to register as a co-owner. After reaching a specified maximum number of consecutive failed attempts, the slave device 120 will not allow the master device 110 any further attempts at registration as a co-owner. In any case, if step 420 fails, then the slave device 120 prevents the master device 110 from using the restricted service requested in step 412.

Although not depicted in FIG. 4, in some implementations, if the number of consecutive failed attempts by the master device 110 exceeds the specified maximum value, then the slave device 120 would perform a self-secure routine as protection against tampering. Depending on the particular implementation, the self-secure routine may include several operations to safe guard itself, depending on factors such as the slave device's capability, the services offered, and the criticality of data handled by the slave device 120. For example, the slave device 120 may delete all of its stored data if it has some sensitive information that can be misused in wrong hands. Or the slave device 120 may disallow any connection to it for a given period of time, for example, for a specified number of hours.

Second Commerce Mode: Slave Device Sold Separately

As described previously, in this second mode of commerce, a slave device is sold separately from any master device. In this case, the true-owner device will be the initially requesting master device, that is, the first master device that successfully attempts to register as the true owner of the slave device. Note that no master devices may register as co-owner devices before a master device registers as the true-owner device. Other master devices may use the slave device before a master device registers as the true-owner device, but master devices may register as co-owner devices only after a master device registers as the true-owner device. This is also true in the first commerce mode where the slave device is sold with the true-owner device.

In this second mode of commerce, the slave device is pre-configured with an unencrypted key, while each master device is pre-configured with a unique ID number. As in the first mode of commerce, the slave device is also designed to maintain the following information:

- A True-Owner Registration bit indicating whether or not the true-owner device has been registered with the slave device. The default value is '0' indicating that the true-owner device has not been registered;
- The ID number of each registered co-owner device;
- A permissions table that keeps track of whether each of the slave device's services is free, restricted, or locked. The default states are that all services are free;
- A Hide Locked Services bit indicating whether or not the locked services are hidden from non-owner devices. The default value is '0' indicating that locked services are not hidden; and
- A Global Lock bit indicating whether or not any of the slave device's services are restricted or locked. The default value is '0' indicating that no services are restricted or locked, i.e., all services are free.

As in the first commerce mode, before a master device registers with the slave device as the true owner, all services are available for all master devices. When a master device registers as the true owner, the true-owner device can determine whether or not to restrict or lock any of the slave device's services. Furthermore, the true-owner device can subsequently change the permissions for the slave device's services.

Registration for the True-Owner Device

Figure 5:
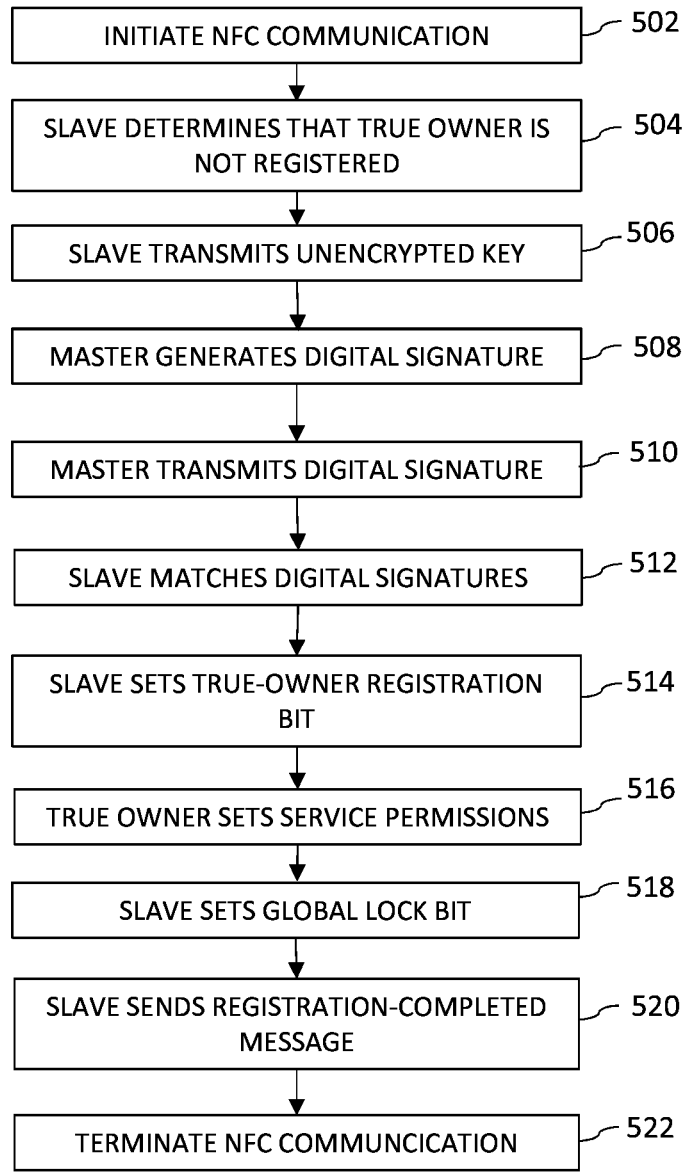
FIG. 5 is a flow chart illustrating processing in the system of FIG. 1 if (i) the slave device is provided separately from the master device and when (ii) the master device registers with the slave device as the true owner.

FIG. 5 is a flow diagram of the processing in the system 100 of FIG. 1 if (i) the slave device 120 is sold separately and when (ii) the master device 110 registers with the slave device 120 as the true owner. The processing of FIG. 5 is similar to the processing of FIG. 2, with some noted differences. All of the communications in FIG. 5 are implemented using the NFC link 140.

In step 502, the powered-on master device 110 and slave device 120 are brought sufficiently close to each other to initiate short-range NFC communication between them. Although not shown in FIG. 5, if the devices 110 and 120 are within Bluetooth range of each other, but not within NFC range, then normal operational processing is performed.

In step 504, the slave device 120 checks the True-Owner Registration bit to determine that no true-owner device has yet been registered. Although not shown in FIG. 5, if the true-owner device 110 had previously registered with the slave device 120 during a previous implementation of the processing of FIG. 5, then the True-Owner Registration bit would have been set during that previous processing and, immediately after current step 504, the NFC communication would be terminated and the current processing of FIG. 5 would end. That would also be the case for any other master device that initiates NFC communications with the slave device 120 after a master device has been registered as the true owner.

In step 506, the slave device 120 transmits its stored unencrypted key to the master device 110.

In step 508, the master device 110 generates the following digital signature:

[MASTER DEVICE ID][UNENCRYPTED KEY][TRUE-OWNER BIT]

where:
- MASTER DEVICE ID is the ID number of the master device 110;
- UNENCRYPTED KEY is the value of the unencrypted key received from the slave device 120; and
- TRUE-OWNER BIT has a value of '1' to indicate that the master device 110 is to be the true owner of the slave device 120.

Note that a master device 110 that does not want to register as the true owner of the slave device 120, will set the TRUE-OWNER BIT to '0' in the digital signature. In that case, the processing of FIG. 5 would terminate after step 512.

In step 510, the master device 110 transmits the digital signature to the slave device 120.

In step 512, the slave device 120 compares the unencrypted key in the digital signature received from the master device 110 with the unencrypted key stored in the slave device 120 and determines that they match. Although not shown in FIG. 5, if the values do not match, then the slave device 120 sends an NFC message to the master device 110 indicating that the attempt to register the master device 110 as the true owner has failed. The slave device 120 then closes its NFC connection to the master device 110. In some implementations, the slave device 120 keeps track of the number of consecutive failed attempts by a master device to register as the true owner. After reaching a specified maximum number of failed attempts, the slave device 120 will not allow the master device 110 any further attempts at registration.

In step 514, the slave device 120 sets the True-Owner Registration bit to '1' to indicate that the true owner has been registered and transmits to the true-owner device 110 an NFC message indicating that true-owner registration was successful.

In an implementation in which the master device 110 does not include a TRUE OWNER BIT field in the digital signature transmitted in step 508, the slave device 120 would query the master device 110 prior to step 514 as to whether the master device 110 wants to register as the true-owner device. If the master device 110 responds in the affirmative, then the processing will continue to step 514. Otherwise, if the master device 110 responds in the negative, then processing will terminate before implementing step 514.

In step 516, the slave device 120 allows the registered true-owner device 110 to set permissions for the services offered by the slave device 120 using a table identical to Table I.

In step 518, if any of the services are restricted or locked, then the slave device 120 sets its Global Lock bit to '1'; otherwise, the slave device 120 maintains the Global Lock bit at its default value of '0'. In step 520, the slave device 120 sends the true-owner device 110 an NFC message indicating that the true-owner registration process is complete. In step 522, the slave device 120 and the true-owner device 110 terminate the NFC connection. As indicated previously, after the true-owner device 110 is registered with the slave device 120, any subsequent attempt by any master device to register as the true owner with the slave device 120 will fail.

Although not represented in FIG. 5, in some implementations, the slave device 120 shares a master reset key with the true-owner device 110, which the user of the true-owner device 110 should safely store elsewhere. If the true-owner device 110 is lost or permanently damaged, then the true-owner device 110 would not be available to modify the permissions previously set in Table I. In that case, the user can configure another master device to provide the reset key to the slave device 120, for example, to reset all of the permissions to the default of having all of the slave device's services free.

Normal Operations for the True-Owner Device

The normal operations for a true-owner device in this second mode of commerce are identical to those in FIG. 3 for the first mode of commerce.

Normal Operations for a Non-True-Owner Device

The normal operations for a non-true-owner device in this second mode of commerce are identical to those in FIG. 4 for the first mode of commerce, except that the co-owner key would include the unencrypted key instead of a decrypted key.

Unless explicitly stated otherwise, each numerical value range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A slave device for use with one or more master devices, the slave device comprising:
   a registration component configured to enable a master device to register as a true-owner device of the slave device; and
   a processing module configured to enable at least the true-owner device to use the slave device, wherein:
      the slave device supports one or more services;
      the slave device allows the true-owner device to selectively limit access to said one or more services by other master devices;
      the slave device is configured to enable one or more non-true-owner devices to register as co-owner devices; and
      for each of said one or more services, the slave device allows the true-owner device to set permission for the service as one of (i) a free service that can be used by any master device, (ii) a restricted service that can be used only by the true-owner device and any co-owner devices, and (iii) a locked service that can be used only by the true-owner device; and
   wherein the slave device is configured to:
      store a co-owner key;
      allow a previously registered co-owner device to use any free or restricted services; and
      allow a non-true-owner device to request a service from the slave device, wherein (i) if the slave device determines that the requested service is a free service, then the slave device allows the non-true-owner device to use the service, (ii) if the slave device determines that the requested service is a restricted service, then the slave device prompts the non-true-owner device to transmit a co-owner key, which the slave device receives, (iii) if the slave device determines that the received co-owner key matches the stored co-owner key, then the slave device registers the non-true-owner device as a co-owner device and allows the co-owner device to use the restricted service, and (iv) if the slave device determines that the received co-owner key does not match the stored co-owner key, then the slave device prevents the non-true-owner device from using the restricted service.

2. The slave device of claim 1, wherein:
   the registration component supports communication with the true-owner device via a wireless registration link; and
   the processing module supports communication with the one or more master devices via an operations link having a longer range than the wireless registration link.

3. The slave device of claim 2, wherein:
   the wireless registration link is a Near-Field Communication (NFC) link; and
   the wireless operations link is not an NFC link.

4. The slave device of claim 1, wherein the stored co-owner key comprises an identification (ID) number of the true-owner device and one of a decrypted key and an unencrypted key.

5. The slave device of claim 1, wherein the slave device enables the true-owner device to hide locked services from non-owner devices.

6. The slave device of claim 1, wherein the slave device is configured such that only one specific master device can be the true-owner device.

7. The slave device of claim 6, wherein the slave device is configured to:
  store an identification (ID) number for the one specific master device, an encrypted key, and a decrypted key corresponding to the encrypted key;
  transmit the encrypted key to the one specific master device;
  receive the ID number and the decrypted key from the one specific master device; and
  match (i) the received ID number to the stored ID number and (ii) the received decrypted key to the stored decrypted key to register the one specific master device as the true-owner device.

8. The slave device of claim 1, wherein the slave device is configured such that an initially requesting master device can be the true-owner device.

9. The slave device of claim 8, wherein the slave device is configured to:
  store an unencrypted key;
  transmit the unencrypted key to the initially requesting master device;
  receive an identification (ID) number and an unencrypted key from the initially requesting master device; and
  match the received unencrypted key to the stored unencrypted key to register the initially requesting master device as the true-owner device.

10. The slave device of claim 1, wherein the slave device performs a self-secure routine after the slave device detects a specified threshold number of consecutive failed attempts by a master device to register as the true-owner device or as a co-owner device.

11. A master device for use with a slave device, the master device comprising:
  a registration component configured to enable the master device to register as a true-owner device of the slave device;
  and
  a processing module configured to enable at least the true-owner device to use the slave device, wherein:
    the slave device is configured to support one or more services;
    the true-owner device is configured to selectively limit access to said one or more services by other master devices,
    the slave device is configured such that only the master device can be the true-owner device; and
    to be registered as the true-owner device, the master device is configured to:
      store a decrypting key;
      receive an encrypted key from the slave device;
      generate a decrypted key using the stored decrypting key to decrypt the encrypted key; and
      transmit an identification (ID) number for the master device and the decrypted key to the slave device.

12. A master device for use with a slave device, the master device comprising:
  a registration component configured to enable the master device to register as a true-owner device of the slave device;
  and
  a processing module configured to enable at least the true-owner device to use the slave device, wherein:
    the slave device is configured to support one or more services;
    the true-owner device is configured to selectively limit access to said one or more services by other master devices,
    the slave device is configured such that an initially requesting master device can be the true-owner device; and
    to be registered as the true-owner device, the master device is configured to:
      receive an unencrypted key from the slave device; and
      transmit an identification (ID) number for the master device and the unencrypted key to the slave device.

13. The master device of claim 11, wherein, for each of said one or more services, the true-owner device is able to set permission for the service as one of:
  a free service that can be used by any master device;
  a restricted service that can be used only by the true-owner device and any co-owner devices; and
  a locked service that can be used only by the true-owner device.

14. The master device of claim 13, wherein the slave device enables the true-owner device to hide locked services from non-owner devices.

15. The master device of claim 11, where the true-owner device is capable of unregistering one or more previously registered co-owner devices for the slave device.

* * * * *